United States Patent Office 3,255,023
Patented June 7, 1966

3,255,023
MEAT CURING COMPOSITION AND METHOD
FOR CURING MEAT THEREWITH
Thomas William Humphreys, North Plainfield, and David
F. Hinkley, Plainfield, N.J., assignors to Merck & Co.,
Inc., Rahway, N.J., a corporation of New Jersey
No Drawing. Filed Aug. 7, 1963, Ser. No. 300,700
9 Claims. (Cl. 99—222)

This invention relates to an improved method of curing meats and, more particularly, to an economical mehod for accelerating the curing of meat and to compositions useful in meat curing.

Originally, one of the main purposes of curing meat was to preserve the meat without refrigeration. The so-called curing process consisted essentially of the addition of salt. Later it was found that by the addition of various agents the flavor and color of the meat could be substantially enhanced. It was also found that the use of other agents, notably ascorbic acid, its isomers and salts, accelerated and stabilized the curing of meat so that the time involved in the curing process could be substantially reduced, resulting in faster and more carefully controlled curing cycles.

In the processing of meat today it is now a common practice to employ curing salt compositions which include sodium chloride, an alkali metal nitrite and/or nitrate along with ascorbic or isoascorbic acid. If desired, sugar in the form of cane, beet, or corn sugar may also be added to the medium, which in addition to enhancing the flavor is also of importance in producing a desirable curing medium. Phosphate in the form of sodium tripolyphosphate, sodium metaphosphate and trisodiumphosphate may also be added to the curing medium in varying amounts in accordance with methods previously described in the prior art. Other agents such as spices and various seasonings are also commonly employed in the curing process. In general, therefore, it might be said that ordinarily the main ingredients employed in the curing of meat are sodium nitrate, sodium nitrite, sugar and ascorbic acid or an isomer, salt or ester thereof.

It will be observed from the foregoing that, of the principal additives employed in the curing of meat, ascorbic acid or one of its isomers is the most expensive of the ingredients utilized.

It is an object of this invention to provide a mehod for the curing of meat which is substantially reduced in cost when compared with the presently-employed salt ascorbate mediums.

It is a further object to provide such a low-cost medium which, however, will function in such a way that a rapid, carefully-controlled curing reaction will be effected.

A still further object of the present invention is to provide curing mediums and a method of curing meat which will result in the development of a desirable cure color in the meat which is stable under exposure to fluorescent light for long periods of time.

In accordance with one embodiment of our invention, it has been found that it is possible to effect a rapid and carefully-controlled cure of meat by employing a curing medium which, in addition to a source of nitric oxide, includes a small amount of alloxan (mesoxalylurea). One of the desirable features of this particular compound used as a curing agent is that a rapid cure of the meat may be obtained by using unusually small amounts of the compound in the curing medium. Also, since it is chemically compatible with ascorbate salts, it may desirably be included as an additional ingredient in a conventional ascorbate curing medium.

In accordance with a further embodiment of our invention, it has been found that when amounts of at least 0.00055% of alloxan, based on the weight of the meat, are incorporated into the curing medium, the characteristic pink-red color of the cured meat is stabilized against fading to a brown color when the meat is exposed to fluorescent light for a relatively long period of time.

In accordance with a further embodiment of our invention, it has been found that the alloxan can be employed with particular advantage as a component of a so-called "pickling solution," i.e., a water solution of salt, sodium nitrite and other curing agents. In such a method it is desirable to maintain the pH of the pickling medium at between about 5 and about 8.5 in order that the curing reaction will take place efficiently. Although the pickling solution may be merely a solution of the desired ingredients in which the meat may be soaked, a more desirable practice in the rapid curing of meat is to employ a so-called "pumping pickle" or "injection pickle," thus shortening the time necessary to effect complete curing of the piece of meat to be cured.

This medium is particularly desirable for the curing of primal cuts of meat such as hams, loins and the like. The meat to be cured may be allowed to soak in the pickle solution or, if a more rapid cure is desired, the pickling solution may be injected into the meat to permit a more rapid diffusion of the curing agent throughout the tissue.

Pursuant to a still further method of carrying out the process of our invention, comminuted meat of the type used in preparing commercial sausages, such as frankfurters, is mixed with a curing salt mixture containing sodium chloride, sodium nitrate and a small amount of alloxan. The amounts of salts and additives which are included in the dry salt curing mixture should be so adjusted that an aqueous solution of the curing mixture has a pH of from about 5 to about 8.5.

According to one further embodiment of our invention, there are provided dry homogenous compositions including a small amount of alloxan and a diluting edible carrier composition which contains no nitrate curing salt. These compositions may be used in fresh meat processing as well as in cured meat processing. It is desirable to have such compositions available for the nitrite curing of meat in view of the fact that compositions containing both nitrite salts and alloxan are subject to deterioration when stored for long periods under variable conditions of temperature.

Such compositions include sodium chloride which may take the place of, or supplement, the sodium chloride contained in a nitric-oxide producing curing composition. In such curing compositions containing sodium chloride and a small amount, e.g., at least about .0055% of alloxan there are also included a variety of binders, fillers, seasoning and flavoring agents such as sugars, spices in the form of oils or oleoresins or as ground spice. These dry curing compositions may also contain other edible ingredients such as flours, starches, corn sugar, cane sugar, casein, dry powdered milk and gelatin. Compositions of this type may be prepared for distribution and use in the curing of meat, along with added alkali metal nitrates and/or nitrites and additional sodium chloride, if desired. The amount of the composition which is added along with the nitrite salt mixture is adjusted so that there is provided from .000055% to about .0055% of alloxan, based on the weight of the meat.

The curing mixtures utilized in the process of our invention may be employed conveniently in the preparation of other types of special meat products. For example, pork bellies may be cured for bacon by the use of a dry salt mixture containing at least .000055% of alloxan. In addition, various cured meat products which may be produced in accordance with the present invention are frankfurters, Vienna sausage, bologna, cured meat loaves, salami, chopped ham, and the like.

In accordance with our invention, we have found that alloxan can be added to other curing agents in an amount which is dependent on the method of cure used, the material which is being cured, the acceleration of cure desired, or the need to maintain the cure color for prolonged periods of time on exposure of the cured meat to fluorescent light. The amount of alloxan which is added to the curing mixture varies with the curing reaction and is partly dependent on the amount of cure acceleration required and on the desirability for having unusual color stability conferred on the cured meat. The exact amount must be determined, in most cases, experimentally, and is dependent upon the specific curing medium selected. In most cases it has been found that adding alloxan in an amount of at least .000055%, based on the weight of the meat, results in a rapid, accelerated cured. Amounts used in excess of about .0011% alloxan, based on the weight of the meat, when employed as a curing agent in combination with a nitric oxide producing medium, result in the production of a cured meat product having a desirable pink-red cure color which is stable and does not fade for long periods of time on exposure to fluorescent light.

It has been found generally satisfactory when a stabilized cure color is desired to employ amounts of alloxan ranging from about .0011% to about .0028%, based on the weight of the meat. Amounts in excess of .0028% up to about .011% can be used, if desired, but it is believed that amounts in excess of about .0028% are unnecessary and, thus, uneconomical in the meat curing process. If color stability under exposure to fluorescent light in the cured meat is not a necessary feature of the desired product, smaller amounts of the curing agent than .0011% may be employed in the curing reaction. However, at least an amount of about .000055%, based on the weight of the meat, should be employed in order to provide a curing medium which will effect an accelerated and rapid cure when employing a nitric oxide curing medium.

In the examples which follow, the cure color of the meat was visually inspected and given a relative intensity of cure color rating based on comparison with a standard sample of cured meat, ranging from 0 (which represents complete loss of red cure color) to a value of 6 (a pinky-red full cure color). The examples which follow are intended to be merely illustrative of some of the specific embodiments of our invention, the limits of which are defined in the appended claims.

*Example 1.—The curing of chopped meat with alloxan*

Experimental sausage is prepared from fresh ground meat comprising 60% bull meat chucks and 40% pork shoulder in admixture with curing agents according to the following formula:

| | |
|---|---|
| Meat, gm. | 100 |
| Sodium nitrite, ml. of 1% stock solution | 1.0 |
| Sodium chloride, gm. | 3.0 |
| Crushed ice, gm. | 30 |

The meat, ice, salt and sodium nitrite are first chopped in a stainless steel Waring Blendor until the temperature of the mixture reaches 10° C. The appropriate amount of alloxan is then added and chopping continued until the temperature reaches 13° C. The resultant emulsion is then stuffed into a 150 ml. beaker, covered with aluminum foil, stored under refrigeration until all samples are prepared, and subsequently cooked out at 73° C. for 45 minutes. During cooking, the rate of cure color development is observed visually at three minute intervals. Full cure color is arbitrarily assigned a value of 6; complete lack of cure color development is recorded as 0. Intermediate values are assigned depending upon the visually estimated degree of color development. The rapidity of development of cure color on the addition of small amounts of alloxan compared with the control sample containing no alloxan is evident from the data in the following tables.

TABLE A.—CURE COLOR DEVELOPMENT—RELATIVE INTENSITY

| Minutes | Control—No Test Agent Added | .001% Alloxan Added (by Weight of Meat) | .0001% Alloxan Added (by Weight of Meat) |
|---|---|---|---|
| 0 | 0 | 0 | 0 |
| 3 | 0 | 2 | 0 |
| 6 | 0 | 3 | 0 |
| 9 | ½ | 5 | ½ |
| 12 | ½ | 6 | 1 |
| 15 | ½ | | 1½ |
| 18 | 1 | | 2 |
| 21 | 1 | | 3 |
| 24 | 1 | | 4 |
| 27 | 2 | | 5 |
| 30 | 3 | | 6 |
| 33 | 4 | | |
| 36 | 5 | | |
| 40 | 6 | | |

TABLE B.—CURE COLOR DEVELOPMENT—RELATIVE INTENSITY

| Minutes | Control—No Test Agent Added | .00061% Alloxan Added (by Weight of Meat) |
|---|---|---|
| 0 | ½ | 2 |
| 3 | ½ | 4 |
| 6 | ½ | 6 |
| 9 | ½ | |
| 12 | ½ | |
| 15 | ½ | |
| 18 | 1 | |
| 21 | 1 | |
| 24 | 1 | |
| 27 | 1½ | |
| 30 | 1½ | |
| 33 | 1½ | |
| 36 | 2 | |
| 45 | 2 | |

TABLE C.—CURE COLOR DEVELOPMENT—RELATIVE INTENSITY

| Minutes | Control—No Test Agent Added | .00055% Alloxan Added (by Weight of Meat) |
|---|---|---|
| 0 | 0 | 0 |
| 3 | 0 | 1 |
| 6 | 0 | 2 |
| 9 | 0 | 3 |
| 12 | 0 | 4 |
| 15 | 0 | 6 |
| 18 | 0 | |
| 21 | 1 | |
| 24 | 1 | |
| 27 | 2 | |
| 30 | 4 | |
| 33 | 6 | |

*Example 2.—Use of alloxan in the pickling curing of pork*

Fresh pork hams are injected with a pumping pickle and immersed in another covering pickle, and stored at refrigerator temperatures. The hams treated in this manner develop a desirable red color within a short period after treatment. Cutting of the meat shows that the red color is fairly well developed through most of the interior. When amounts of alloxan in excess of about .0011% based on the weight of the meat are employed, slices of the meat, when exposed to fluorescent light for long periods of time, maintain their full red cure color. The injection pickle used has the following composition:

| | |
|---|---|
| Salt, percent | 14.5 |
| Cane sugar, percent | 3.0 |
| Sodium hexameta phosphate, percent | 3.0 |
| Sodium nitrite (2 pounds per 100 gallons*), percent | 0.21 |
| Water, percent | 79.3 |
| pH | 6.8 |
| Alloxan, percent | (.0005–.028) |

*Density of pickle solution is about 9.5 pounds/gallon.

The covering pickle used has the following approximate composition:

| | Percent |
|---|---|
| Sodium nitrite | 0.05 |
| Sodium nitrate | 0.08 |
| Sucrose | 1.5 |
| Sodium chloride | 15.0 |
| Alloxan | .0011 |

The above examples are presented to illustrate the methods of carrying out the present invention.

Various changes and modifications of the invention can be made, and to the extent that such variations incorporate the spirit of this invention, they are intended to be included within the scope of the appended claims.

What is claimed is:

1. A meat curing preparation including sodium chloride, nitric oxide-producing medium, and a sufficient amount of alloxan to accelerate the meat cure and stabilize the cure color, said meat curing preparation having a pH range of about 5.0 to about 8.5.

2. A solid salt composition for the curing of meat containing sodium chloride, at least one member selected from the group consisting of alkali metal nitrate and an alkali metal nitrite and a sufficient amount of alloxan to accelerate the meat cure and stabilize the cure color, said solid curing salt composition having a pH range from about 5.0 to about 8.5.

3. A meat pickling solution comprising an aqueous solution of sodium nitrite, sodium chloride, sucrose and a sufficient amount of alloxan to accelerate the meat cure and stabilize the cure color, said pickling solution having a pH range of about 5.0 to about 8.5.

4. A method for curing meat to accelerate the rate of curing and to stabilize the color of the cured meat which comprises contacting the meat with at least 0.000055% by weight of the meat of alloxan and a nitric oxide-producing curing medium in a pH range of about 5.0 to about 8.5.

5. The method according to claim 4 wherein the amount of alloxan is from about 0.0011% to about 0.0028% based upon the weight of the meat.

6. A method of curing meat, the improvement of which comprises carrying out the curing reaction with a nitric acid-producing curing medium in a pH range of about 5.0 to about 8.5 containing at least 0.000055% of alloxan based upon the weight of the meat.

7. The improved method of accelerating the rate of cure and of stabilizing the cure color of meat which is being cured by the action of a curing composition containing alkali nitrite, said method consisting of adding to said curing composition before use alloxan in an amount of at least 0.000055% based upon the weight of the meat, said curing composition having a pH range of about 5.0 to about 8.5.

8. A method in the preparation of a cured sausage product to accelerate the rate of cure and stabilize the cure color of the sausage product which comprises incorporating into a sausage emulsion containing a nitric oxide-producing curing medium at least 0.000055% by weight of the sausage meat of alloxan, said emulsion having a pH range of about 5.0 to about 8.5.

9. The preparation of a cured sausage product according to claim 8 wherein the amount of alloxan is from about 0.0011% to about 0.0028% based upon the weight of the sausage meat.

References Cited by the Examiner

UNITED STATES PATENTS

| 2,828,212 | 3/1958 | Sair | 99—159 X |
| 2,693,374 | 12/1960 | Sanders | 99—222 X |
| 3,033,687 | 5/1962 | Harper et al. | 99—159 X |
| 3,051,579 | 8/1962 | Hammes | 99—222 X |

OTHER REFERENCES

Hill et al.: "Organic Chemistry," 1943, pub. by The Blakiston Company, Philadelphia, Pa., p. 800.

A. LOUIS MONACELL, *Primary Examiner.*

HYMAN LORD, *Examiner.*